(No Model.) 2 Sheets—Sheet 1.

C. A. MORRIS & R. G. PACKARD.
METHOD OF REMOVING MUD, &c.

No. 411,928. Patented Oct. 1, 1889.

(No Model.) 2 Sheets—Sheet 2.

C. A. MORRIS & R. G. PACKARD.
METHOD OF REMOVING MUD, &c.

No. 411,928. Patented Oct. 1, 1889.

Witnesses
Chas H. Smith
J. Staib

Inventors
Charles A. Morris.
Ralph G. Packard.
per Lemuel W. Serrell
atty

UNITED STATES PATENT OFFICE.

CHARLES A. MORRIS, OF BLOOMFIELD, AND RALPH G. PACKARD, OF MORRISTOWN, NEW JERSEY.

METHOD OF REMOVING MUD, &c.

SPECIFICATION forming part of Letters Patent No. 411,928, dated October 1, 1889.

Application filed December 21, 1888. Serial No. 294,322. (No model.)

*To all whom it may concern:*

Be it known that we, CHARLES A. MORRIS, of Bloomfield, in the county of Essex and State of New Jersey, and RALPH G. PACKARD, of Morristown, Morris county, in the State of New Jersey, have invented an Improvement in the Method of Removing Mud or other Material in Vessels, of which the following is a specification.

Dredging-machines are extensively made use of for excavating mud, sand, or other materials in rivers and harbors, and such materials are usually received into scows, and scows are also made use of for the reception of ashes, earth, stones, &c., from carts or other vehicles, and these scows or vessels are towed out to sea or to a place of deposit. In most cases where scows are employed there is not room enough for the use of large scows, and in towing numerous small scows out to sea difficulty arises, especially in rough weather, and each scow has to be manned, and the number of hands employed in attending upon the scows is considerable.

In consequence of the difficulty of using large vessels for the reception of dredged or refuse materials the contents of the smaller scows have in some instances been transferred to large scows by scoops or elevators; but this renders it necessary to handle the excavated material twice.

The object of our invention is to facilitate the transportation and disposition of heavy or refuse materials and lessen the number of hands employed and the cost of handling the same; and with this object in view we provide a large scow or vessel capable of receiving the contents of a number of ordinary scows or vessels, and we sink the receiving-vessel to a sufficient depth for floating over it the smaller vessels or scows, so that the contents of the smaller scows can be dumped in succession into the larger vessel, and then, when the receiving-vessel is full, it is raised to the surface, so as to be towed or propelled out to sea or to any other place where the contents are finally to be discharged.

Figure 1:
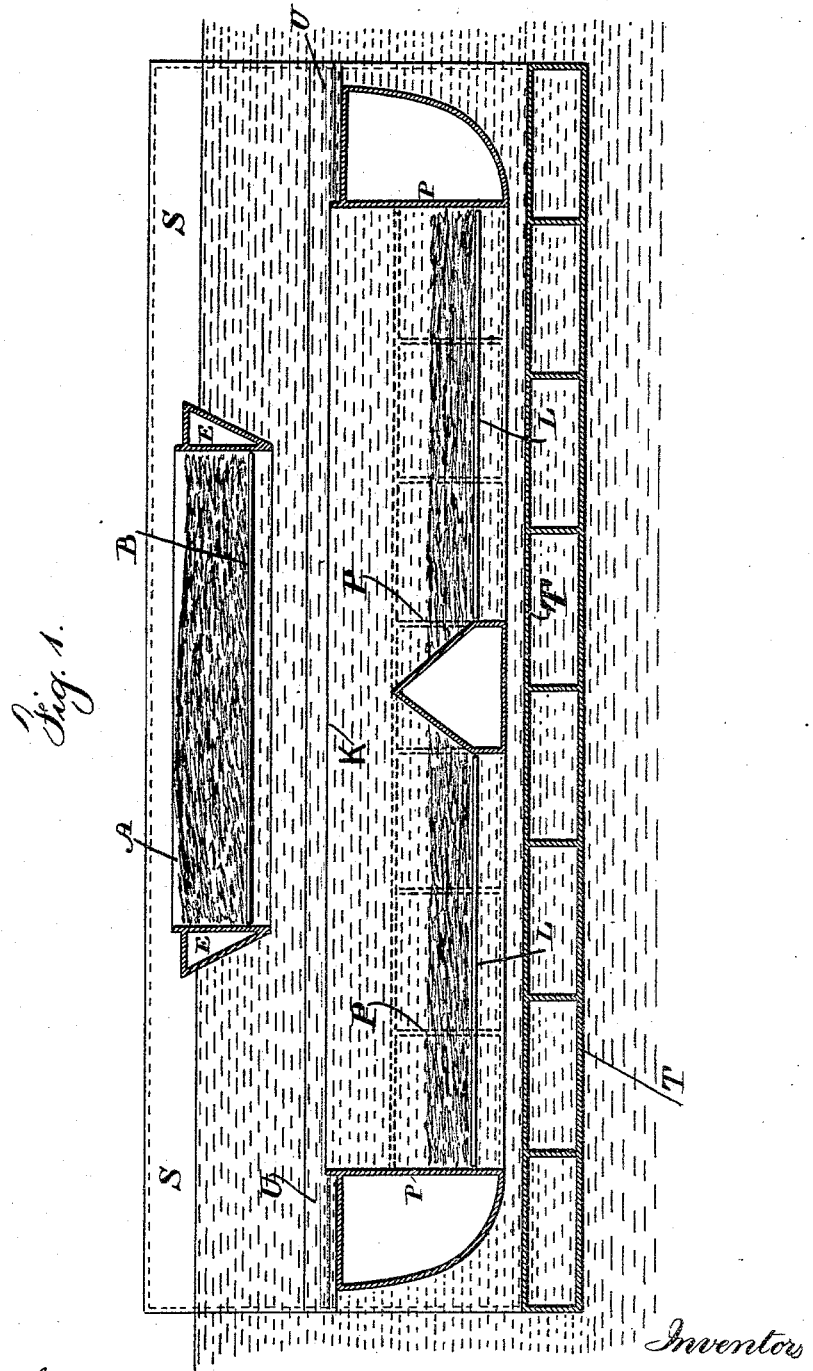
Figure 2:
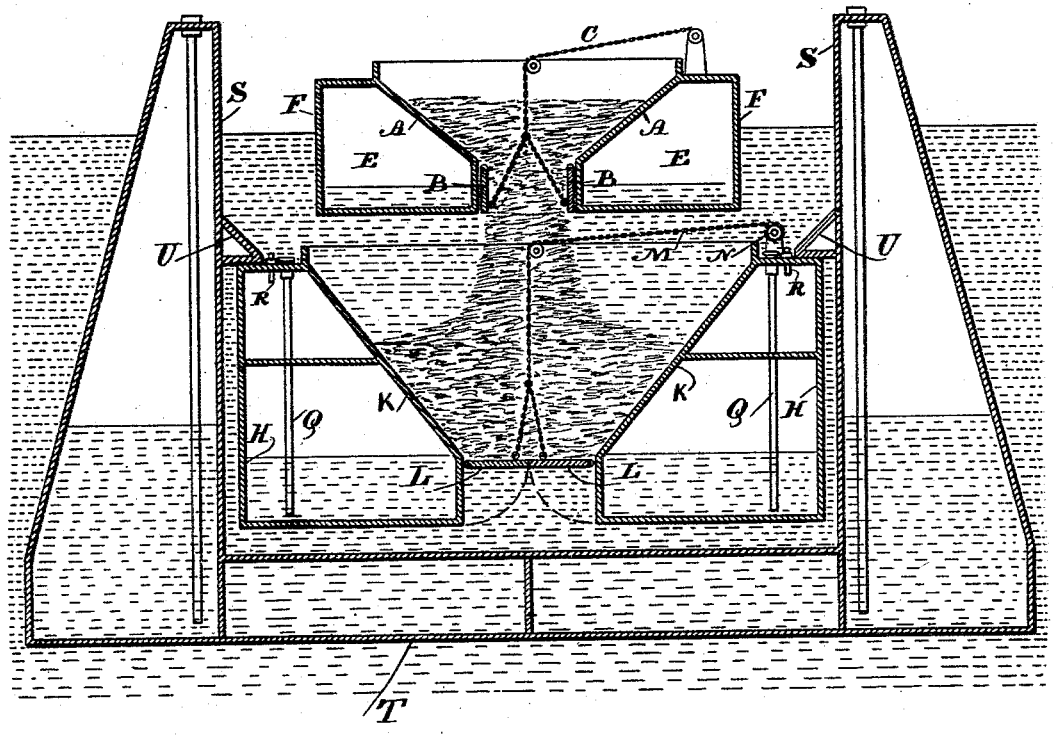

In the drawings, Figure 1 is a longitudinal section of the receiving-vessel as sunk to a depth for the smaller vessels or scows to be floated over the same; and Fig. 2 is a cross-section in larger size of the receiving-vessel, one of the ordinary scows, and a floating dock.

The ordinary small scows are usually made with a central receptacle for the mud or other material, the sides of which slope downwardly, as at A A, to the longitudinal discharge-opening, in which are doors or flaps B B, that are closed upwardly by the action of chains C and a windlass, and the external shape of the scow approximates that of a canal-boat, so that there may be floating compartments E between the receiver A and the outsides F of the vessel, and these scows are comparatively small, so as to be easily brought into position for receiving the excavated or dredged material or the ashes or other substances that may be dumped into such scow.

The receiving-vessel is preferably made in a manner similar to the small scows, only very much larger, and adapted to the ocean or to being propelled or towed to any place where the materials are to be delivered. In the drawings we have shown this receiving-vessel as having an exterior planking H, similar to that of a vessel, and with an interior planking K, forming the sides of the receiver, into which the refuse or other material is to be dumped, and there are doors or valves L, closing upwardly within the opening, through which the contents of the scow are discharged when such doors are opened, the chains M and windlass N being made use of in closing the doors, and the vessel is to be divided into compartments by bulk-heads P between the exterior of the vessel and the lining, so as to insure the proper floating capacity, even though the exterior of the vessel may have been accidentally injured or become leaky, and it is desirable to provide a pipe Q to each compartment, to which a connection can be made to a suitable steam-pump for pumping out water from either of the compartments, and it is necessary to provide a second pipe R to each compartment, to which a suitable hose or pipe can be connected and rise above the surface of the water, so that air can be admitted into the compartments as the water is pumped out, and these pipes are to be provided with suitable gates or cocks for opening or closing the same.

We have represented at S T U an ordinary dock, the same being provided with compartments, as usual in such docks, and being of a sufficient size for the receiving-vessel. This dock we prefer to construct with cleats or brackets U upon the sides S thereof, so that the receiving-scow may be floated into the dock after such dock has been lowered in the usual manner sufficiently for the receiving-vessel to pass in beneath the cleats or brackets U, and then the dock is to be lowered, as usual, by admitting water into the respective compartments of such dock, and as the dock descends it carries down with it the receiving-scow until the same is at a sufficient distance below the surface of the water to allow the ordinary small scows to be floated in over such receiving-scow, in order that the contents of such small scows may be dumped bodily into such receiving-vessel by opening the doors of the small scows as such small scows are drawn in successively over the large scow; and it is to be understood that as the dumping progresses and the weight of the receiving-vessel and its contents increases the compartments of the dock can be pumped out more or less, so as to keep the receiving-vessel as near as convenient to the bottoms of the small scows, in order that the mud or other material deposited may fall but a short distance through the water in passing from the small scows to the receptacle in the large vessel; or water may be pumped out from the compartments of the receiving-vessel during the progress of the dumping, so that the floating capacity of such vessel may counterpoise the weight dumped thereinto from time to time, and when the receiving-vessel is sufficiently full the dock is raised and the compartments of the receiving-vessel are pumped out, so that such vessel will float with the top thereof above the surface of the water, and it is to be drawn out of the dock and towed or propelled to sea, or to the place where the contents of such vessel are to be finally dumped.

It will now be understood that a considerable number of receiving-vessels can be provided, so that one will be put in position for receiving the material from the small scows as soon as necessary after the full vessel has been taken away, and that it is only necessary to provide a sufficient number of small scows to transport the material to the receiving-vessel from the point where the dredging or excavating may be going on.

In almost all floating docks there are suitable pumps for pumping out the compartments, and hence the pipes Q upon the receiving-vessel can be connected by flexible pipes or hose to the pump upon the dock; or such pumps may be upon the steamboat or tug-boat made use of for conveying the receiving-vessel to the place where the contents are finally dumped. This receiving-vessel can be made use of without the dock in cases where the same can be sunk to the desired depth, and it may rest at the bottom of the water or upon any suitable supports—such as heavy frame-work similar to the bottom of the dock—at the proper depth below the surface of the water. In this case water will be admitted to the compartments in the receiving-vessel sufficiently for the same to sink to the desired depth, and this water will be pumped out from such compartments from time to time as the receiving-vessel is loaded, and then such vessel will be floated, so that the upper portion will be above the surface of the water when the vessel is fully loaded, and such vessel can then be towed or propelled away, as before indicated.

The receiving-vessel may be of any desired size or shape so long as it has the capacity for use in the manner herein set forth.

We claim as our invention—

1. The method herein specified of loading, conveying, and discharging materials—such as mud, sand, ashes, &c.—consisting in loading the same first into comparatively small scows or vessels, providing a receiving-vessel of large capacity with compartments, sinking the same sufficiently below the surface of the water for floating the small scows or vessels over the receiving-vessel and discharging the contents of the small scows or vessels into the receiving-vessel and raising such receiving-vessel, so that the upper parts thereof are above the water-line, and floating such vessel to the place where the contents are discharged, substantially as set forth.

2. The method herein specified of receiving and floating away refuse or solid materials, consisting in floating the receiving-vessel into a dock, sinking such receiving-vessel sufficiently below the water-line, floating small scows in above the receiving-vessel, discharging their contents into the receiving-vessel to load the same, and then floating the receiving-vessel and removing the same from the dock to the place of discharge, substantially as set forth.

3. The method herein specified of loading and discharging a receiving-vessel, consisting in sinking the vessel sufficiently below the surface of the water for the reception of its load, introducing the load from above the vessel, pumping out water from the compartments to raise the vessel, towing or propelling the vessel to the place of discharge, and discharging the contents downwardly while the vessel is floating, substantially as specified.

4. The method herein specified of loading vessels and conveying the same to the point of discharge, consisting in sinking the vessel below the surface of the water, discharging the load into the vessel from above it while below the water, floating the vessel to the surface of the water, and towing or propelling the same to the point of delivery of the contents of such vessel, substantially as set forth.

Signed by us this 18th day of December, 1888.

CHARLES A. MORRIS.
  RALPH G. PACKARD.

Witnesses:
 GEO. T. PINCKNEY,
 WILLIAM G. MOTT.